United States Patent [19]

Chao

[11] Patent Number: 5,829,899
[45] Date of Patent: Nov. 3, 1998

[54] WRIST REST FOR INCORPORATION WITH A COMPUTER KEYBOARD

[75] Inventor: Chin-Lung Chao, Taipei, Taiwan

[73] Assignee: Behavior Tech Computer Corporation, Taipei, Taiwan

[21] Appl. No.: 925,537

[22] Filed: Sep. 8, 1997

[51] Int. Cl.$^6$ ................................................. B41J 11/62
[52] U.S. Cl. .......................... 400/715; 248/118; 400/719
[58] Field of Search ..................... 400/715, 719; 341/21, 22; 248/118, 118.1, 118.3, 918

[56] References Cited

U.S. PATENT DOCUMENTS

| | | |
|---|---|---|
| 3,601,445 | 8/1971 | Glynias ................................. 248/118 |
| 5,375,800 | 12/1994 | Wilcox et al. ...................... 248/118.1 |
| 5,386,956 | 2/1995 | Hatcher ................................. 248/118 |
| 5,503,484 | 4/1996 | Louis ..................................... 400/715 |
| 5,513,824 | 5/1996 | Leavitt et al. ......................... 400/715 |
| 5,570,268 | 10/1996 | Selker .................................... 400/715 |

*Primary Examiner*—Edgar S. Burr
*Assistant Examiner*—Anthony H. Nguyen
*Attorney, Agent, or Firm*—Oppenheimer Wolff & Donnelly LLP

[57] ABSTRACT

A wrist rest for incorporation with a computer keyboard enables a user's wrist to have adequate support when typing and is able to be adapted to be incorporated with a different keyboard by adjusting knobs rotatably provided on two opposed sides of the wrist rest.

8 Claims, 4 Drawing Sheets

WRIST REST FOR INCORPORATION WITH A COMPUTER KEYBOARD

FIELD OF THE INVENTION

The present invention generally relates to a wrist rest, and more particularly to a wrist rest for incorporation with a computer keyboard. The wrist rest incorporating with the keyboard provides adequate support to a user's wrist while typing with a computer keyboard, such that the user's wrist will not be hurt after a prolonged period of work.

BACKGROUND OF THE INVENTION

It is common to see a space to accommodate a keyboard is defined in a plate which is slidably received in a desk specially designed for a computer. An edge of the plate facing a user is provided with a bar extending upward from the plate and having a height very much the same as the height of the keyboard, so that the user's wrist will be able to have adequate support while the user is typing. However, when the user changes to another kind of keyboard which has different size and height, due to the fixed height and thickness of the bar, the bar will then no longer provide suitable support to the user's wrist. To overcome the disadvantage, a so-called "Ergonomic Keyboard" is introduced to the market. This kind of keyboard is separated into two halves and each half is spaced apart from each other and also a curved surface is provided to support the user's wrist. This ergonomic keyboard enables a user to use the keyboard easily and smoothly, but the price is much higher than the conventional keyboard. Additionally, users of this ergonomic keyboard will have to abandon their original keyboards in favor of the new one, which is a waste.

From the previous description, it is noted that to fully solve the aforementioned problems, alternatives and/or improvement(s) to the conventional keyboard are thus required. A wrist rest for incorporation with a computer keyboard and constructed in accordance with the present invention tends to mitigate and/or obviate the aforementioned problems.

SUMMARY OF THE INVENTION

The main objective of the invention is to provide a wrist rest for incorporation with a computer keyboard, which is able to provide adequate support to a user's wrist and enables the user to continuously and comfortably use the conventional keyboard.

Another objective of the invention is to provide a wrist rest for incorporation with a computer, which is able to adapt to different keyboards having different heights.

Other objects, advantages and novel features of the invention will become more apparent from the following detailed description when taken in conjunction with the accompanying drawings.

BRIEF DESCRIPTION OF THE DRAWINGS

The present invention will now be better understood with reference of the accompanying drawings wherein.

DETAILED DESCRIPTION OF THE PREFERRED EMBODIMENT

Figure 1:
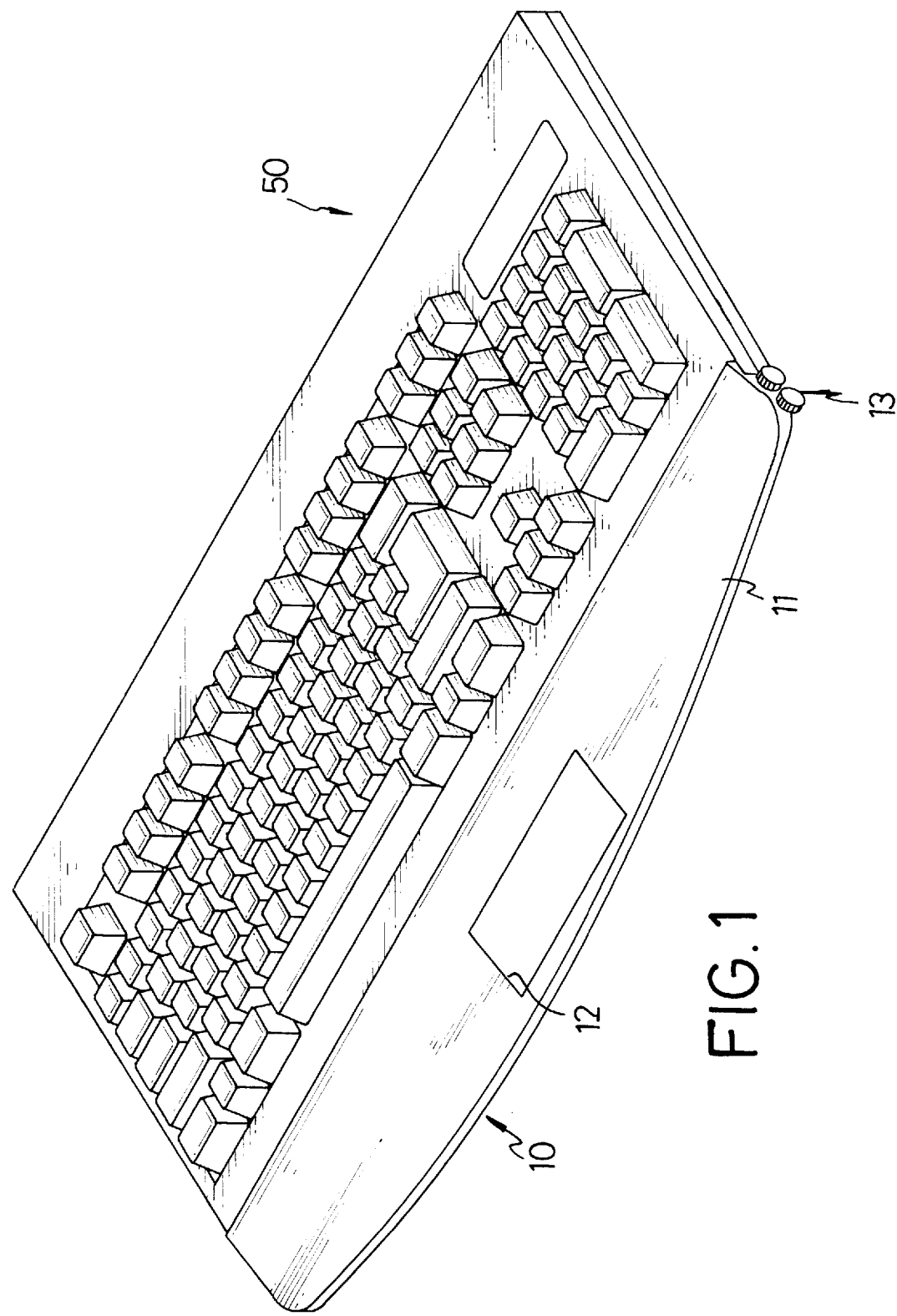
FIG. 1 is a perspective view of a wrist rest of the present invention incorporating with a conventional computer keyboard.

Referring to FIG. 1, one preferred embodiment of a wrist rest 10 constructed in accordance with the present invention and incorporating with a conventional keyboard 50 is shown. The embodiment intends in descriptive purpose and not in any form to limit the scope of the present invention, such that the features of the present invention also apply to various forms of wrist rests 10.

Figure 2:
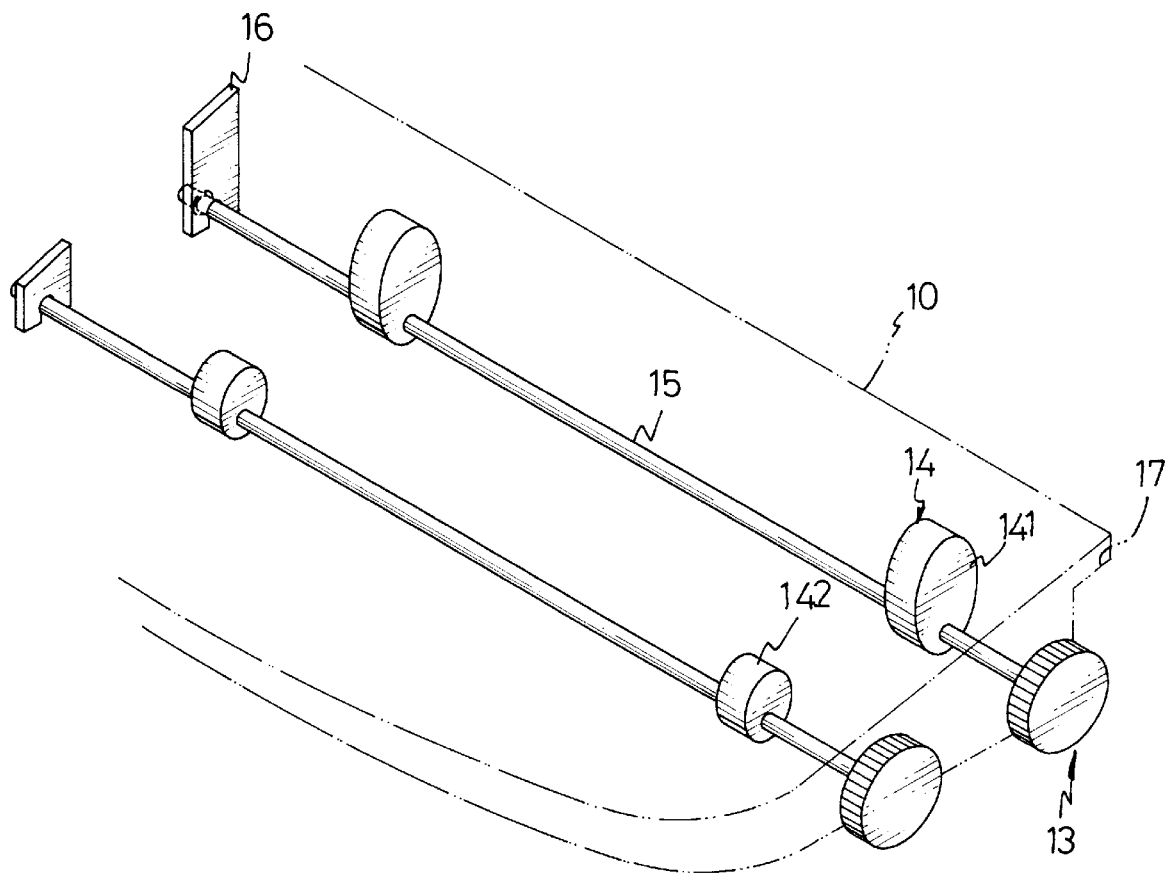
FIG. 2 is a partial perspective view of the wrist rest of the invention showing an inner structure thereof.
Figure 3:
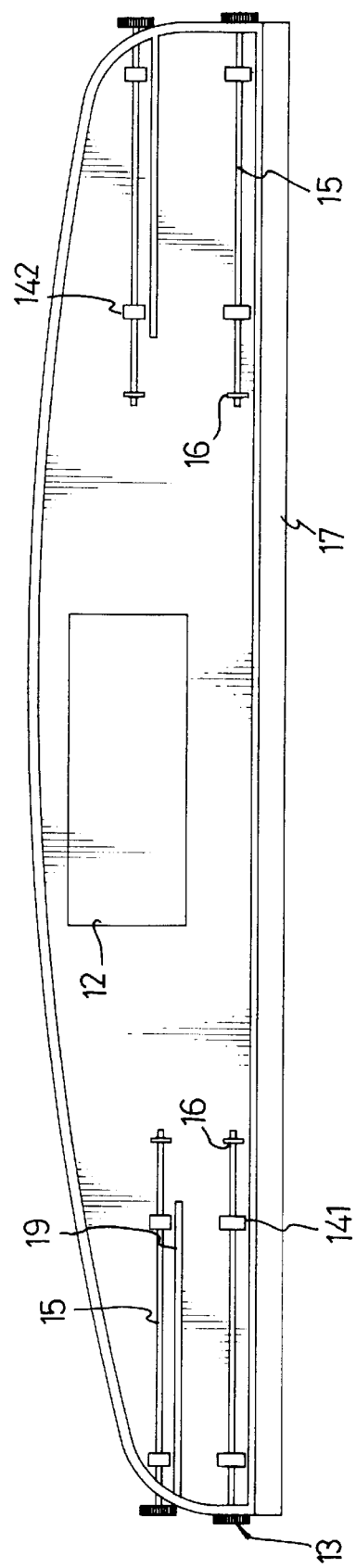
FIG. 3 is a bottom view of the invention showing the inner structure thereof.
Figure 4:
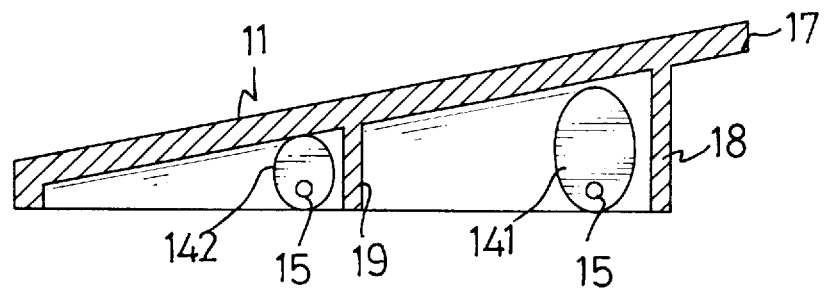
FIG. 4 is a sectional side view showing a relationship between elliptical rollers and side plates.
Figure 5:
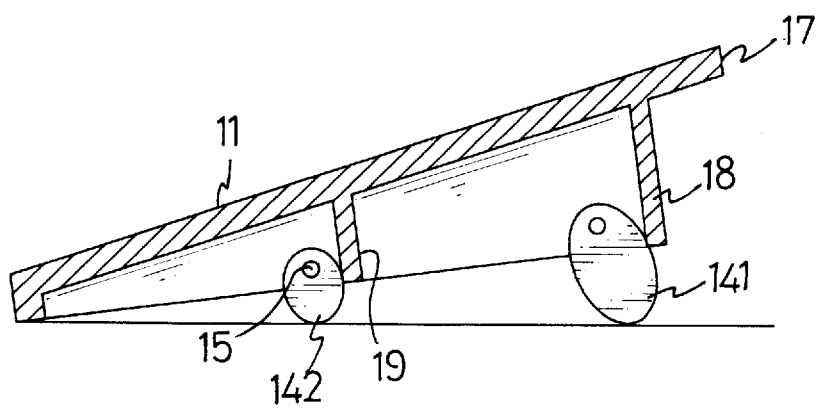
FIG. 5 is a sectional side view showing the relationship between elliptical rollers and side plates after the respective elliptical rollers are adjusted.

In the preferred embodiment of FIG. 1, the wrist rest 10 of the invention includes a surface 11, a through hole 12 defined in a center part of the surface 11 for receiving a tracking device (not shown) therein and a pair of knobs 13 rotatably located on two opposed sides of the surface 11. With reference to FIGS. 2, 4 and 5, a bridge 17 is formed on an edge of the surface 11, such that when the wrist rest 10 of the invention is incorporated with the keyboard 50, the bridge 17 is able to engage with a part of the keyboard 50 and presents a smooth engagement therewith. Additionally, to fulfill one of the requirements of ergonomics, the surface 11, when engaging with the keyboard 50, has an inclination toward the keyboard 50, such that the user's wrist will be able to comfortably rest onto the wrist rest 10 when typing. Furthermore, it is to be noted that since there are two identical sides in the present invention, only one side of the invention is described.

Referring to FIG. 2, it is to be noted that a first end (not numbered) of each of a pair of shafts 15 extends out of a side wall of the surface 11 and is securely connected with a respective one of the knobs 13 and a second end (not numbered) of each of the pair of shafts 15 is pivotally connected with a respective one of a pair of securing devices 16. Each of the securing devices 16 enables the shaft 15 connected therewith to be locked when required, so that when the user rotates the knob 13, the corresponding shaft 15 will also rotate due to the securement relationship therewith and then the securing device 16 will lock the shaft 15 thereafter. Furthermore, a pair of large elliptical rollers 141 are securely and eccentrically mounted onto a rear one of the shafts 15 which is closer to the keyboard 50 and a pair of small elliptical rollers 142 are securely and eccentrically mounted onto the other shaft 15, such that when the wrist rest 10 is connected with the keyboard 50 via the bridge 17, the wrist rest 10 will have an upward inclination toward the keyboard 50 to fulfill one of the requirements of the ergonomics when the user's wrists rest thereon. It is to be noted that the shafts 15 with the large elliptical rollers 141 are aligned, as are the shafts 15 with the small elliptical rollers 142.

Referring to FIGS. 4 and 5, when the wrist rest 10 of the invention is adapted to be incorporated with a keyboard (not shown) having a different thickness and height, the user only needs to turn the knob 13 clockwise or counterclockwise to increase or decrease the inclination of the surface 11, and the large elliptical rollers 141 and the small elliptical rollers 142 which are respectively mounted onto the shafts 15 will rotate accordingly. Thus, the wrist rest 10 is able to be adapted to be incorporated with different keyboards. Furthermore, FIG. 4 shows that a first side plate 18 is provided alongside the large elliptical rollers 141 and a second side plate 19 is provided alongside the small elliptical rollers 142, such that when both the large elliptical rollers 141 and the small elliptical rollers 142 are rotated to allow the shafts 15 to be positioned in an uppermost position within the large elliptical rollers 141 and the small elliptical rollers 142, both the first side plate 18 and the second side plate 19 will act as a stop to limit rotation of the large elliptical rollers 141 and the small elliptical rollers 142.

From the foregoing, it is seen that the objects hereinbefore set forth may readily and efficiently be attained, and since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. A wrist rest for incorporation with a computer keyboard comprising:

a surface;

at least one pair of knobs pivotally connected to both sides of said surface;

at least one pair of shafts provided underneath said surface and a first end of each of which is securely connected with a respective one of said knobs;

at least one pair of opposingly located securing devices which are integrally formed with a bottom face of said surface and rotatably connected with a second ends of each of said shafts, thereby allowing said securing devices to lock said shafts to prevent horizontal movement and rotation thereof;

at least two pairs of large elliptical rollers respectively and eccentrically mounted on one of said shafts, and at least two pairs of small elliptical rollers respectively and eccentrically mounted on the other of said shafts.

2. The wrist rest for incorporation with a computer keyboard as claimed in claim 1 further comprising a bridge integrally extending out from an edge of said surface.

3. The wrist rest for incorporation with a computer keyboard as claimed in claim 1, wherein an opening is defined in said surface.

4. The wrist rest for incorporation with a computer keyboard as claimed in claim 1 further comprising a first side plate and a second side plate each respectively located alongside said large elliptical rollers and said small elliptical rollers to limit rotation of said large elliptical rollers and said small elliptical rollers.

5. A wrist rest for incorporation with a computer keyboard comprises:

a surface;

two pairs of knobs rotatably located on two opposed sides of said surface;

two pairs of shafts located underneath said surface and a first end of each of which is securely connected with a respective one of said knobs;

two pairs of opposingly located securing devices which are integrally formed with a bottom face of said surface and rotatably connected with a second end of each of said shafts, whereby said securing devices lock said shafts to prevent horizontal movement and to limit rotation thereof; and two pairs of large elliptical rollers and small elliptical rollers each respectively and eccentrically mounted onto each of said shafts.

6. The wrist rest for incorporation with a computer keyboard as claimed in claim 5 further comprises a bridge integrally extending out from an edge of said surface.

7. The wrist rest for incorporation with a computer keyboard as claimed in claim 5, wherein an opening is defined in said surface.

8. The wrist rest for incorporation with a computer keyboard as claimed in claim 5 further comprises a first side plate and a second side plate each respectively located along side said large elliptical rollers and said small elliptical rollers to limit rotation of said large elliptical rollers and said small elliptical rollers.

* * * * *